Nov. 3, 1931.     H. McCORNACK     1,829,907
PULSATOR
Filed Oct. 15, 1923     2 Sheets-Sheet 1
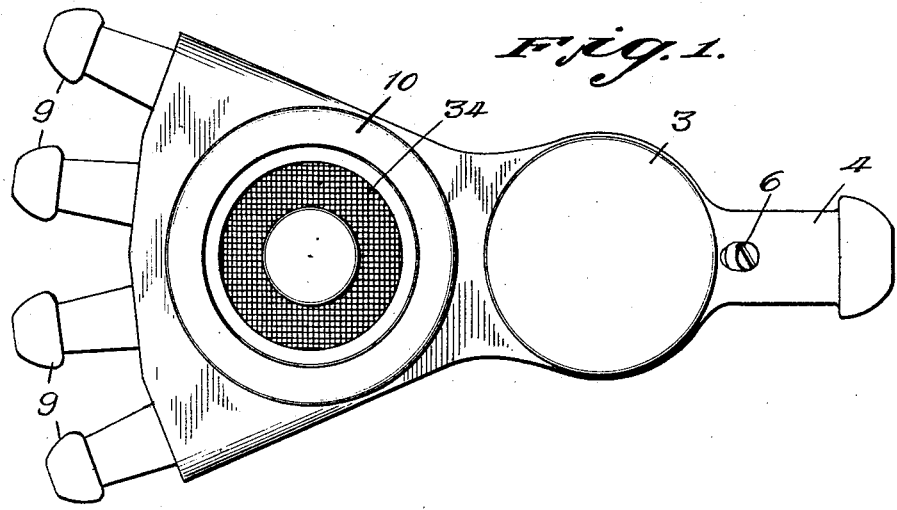
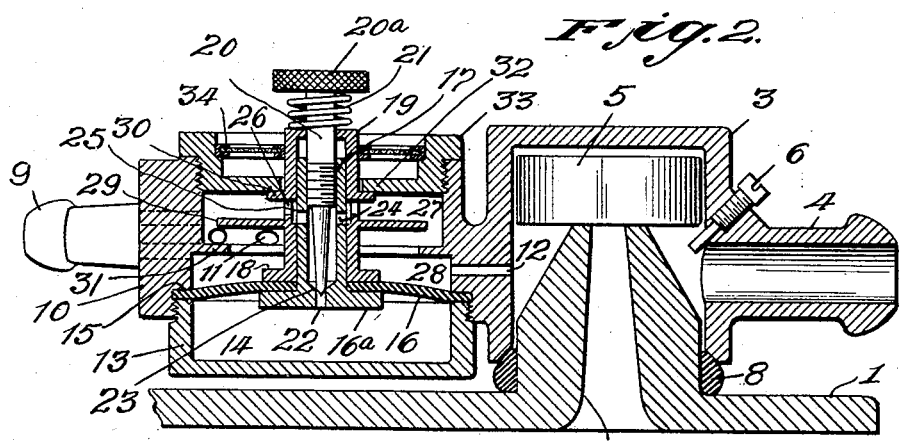
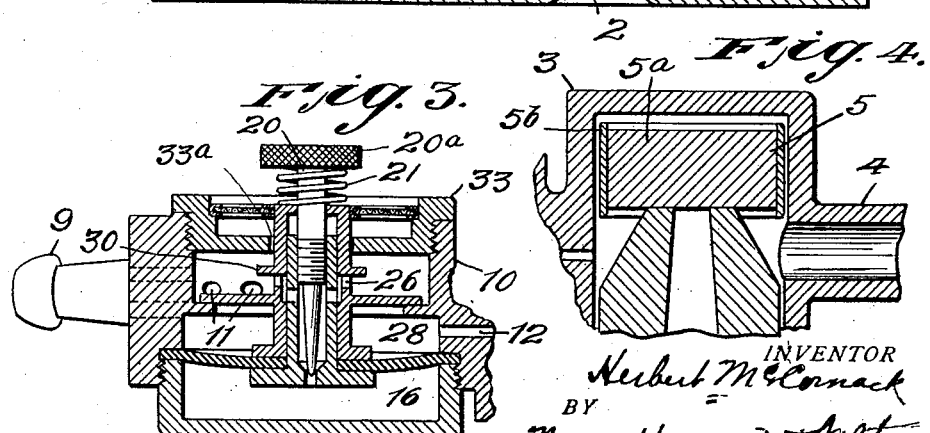

Nov. 3, 1931.   H. McCORNACK   1,829,907
PULSATOR
Filed Oct. 15, 1923   2 Sheets-Sheet 2
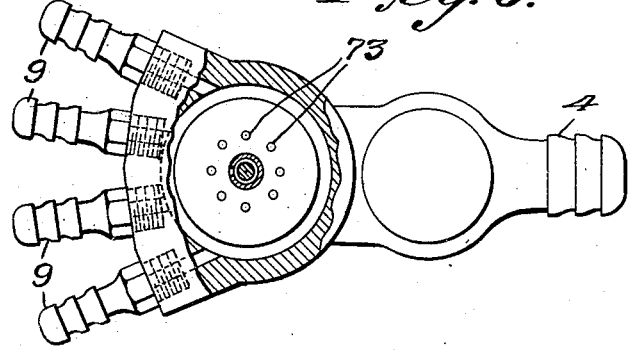
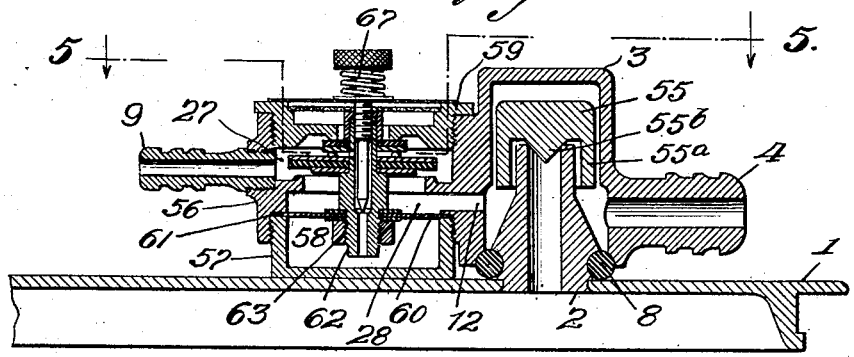
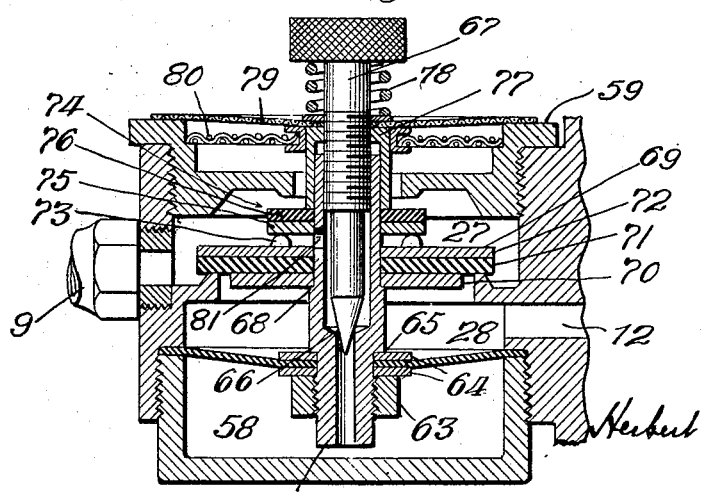
Herbert McCornack
INVENTOR
BY
Moses, Hammond & Nolte
ATTORNEYS Patented Nov. 3, 1931

1,829,907

UNITED STATES PATENT OFFICE

HERBERT McCORNACK, OF GLEN RIDGE, NEW JERSEY

PULSATOR

Application filed October 15, 1923. Serial No. 668,459.

This invention relates to pulsators of the type used in cow milking machinery to cause alternate periods of suction and pressure in the teat cups so as to massage and relieve the teats, preventing congestion thereof and continuous drain upon or injury to the cow.

It is one of the objects of this invention to provide a pulsator of simple construction and fewer parts than heretofore so as to improve the operation and reduce the cost thereof.

Another object is to provide a pulsator with a pliable diaphragm which is controlled by differences in the fluid pressure upon opposite sides thereof, to reverse the valve at regulated intervals to cause the desired pulsations.

Another object of the invention is to provide a pulsator which will operate regularly to change the direction of fluid flow regardless of reasonable variations in the pressure of the actuating fluid or of the degree of vacuum used.

Another object of the invention is to provide a pulsator which is actuated by alternate conditions of atmospheric pressure and vacuum upon one side of a motor element while the other side is subject to a continuous vacuum.

A further object of the invention is to provide a pulsator in which a flexible diaphragm is actuated by variations in the pressure upon one side thereof to cause the desired pulsations, and in which the diaphragm is directly connected to valve means which are actuated by the pulsations of the diaphragm to control the variations in pressure in the teat cups and upon the side of the diaphragm.

Other objects and advantages will appear as the description proceeds.

The invention disclosed herein is in the nature of an improvement on the pulsating mechanism of my Patent No. 1,392,346, issued October 4, 1921.

Referring now to the drawings which illustrate preferred embodiments of the invention.

Figure 1 is a plan view of the preferred form of the pulsator.

Figure 2 is a sectional view of the same, showing the parts in one position of the pulsating cycle.

Figure 3 is a similar view showing the parts in another position.

Figure 4 is a sectional view of a modified form of check valve.

Figure 5 is a plan view on the line 5—5 of Figure 6 of a modified form of pulsator.

Figure 6 is a sectional view of the modification illustrating one position of the parts.

Figure 7 is a view similar to Fig. 6 but on an enlarged scale with the parts in another position.

In the embodiment of the invention illustrated in Figs. 1 to 3, the pulsator is shown as applied to the lid 1 of a milk pail, the lid being provided with an upstanding nipple 2 over which sets the check valve casing of the pulsator. The check valve casing 3 is provided with the nozzle 4 to which the usual vacuum hose (not shown) is connected, the air being thus constantly exhausted from the check valve housing and through the hole in the nipple 2, from the milk pail. Positioned in the check valve casing is a check valve 5 which is held open during the milking operation by the vacuum, and which is returned to its seat on the end of nipple 2 to prevent a loss of vacuum in the pail, when the vacuum hose is disconnected.

To prevent the check valve 5 from falling out of the casing when the pulsator is removed from the pail lid, a retaining screw 6 may be provided. This is of advantage in preventing the valve 5 from dropping on the floor where it may be dented or scarred by the fall or become lost. It is, however, important that the check valve be kept clean and sanitary and that the condensation from the milk vapor which passes through the nipple 2 from the pail, be washed from the valve. To insure that it will be washed regularly it may be advisable to omit the screw 6 from the assemblage, as shown in Fig. 4, so that the valve will drop out and be washed when the pulsator is removed from the lid, thereby not trusting to the attendant's memory to release the screw and take out the valve at frequent intervals.

A form of valve which may be used in this modification is illustrated in Fig. 4, which shows a check valve 5 in which the inner portion 5ª, usually of some soft metal, such as brass, is surrounded by a collar 5ᵇ of harder metal which may be steel for example. In use, the steel collar, which is wider than the part 5ª, will project down around the edges of the nipple 2 so that only the softer part of the valve will touch the nipple. If, however, the valve is accidently dropped upon a hard surface, the hard collar 5ᵇ will protect the inner portion from injury.

A suitable gasket 8 or other sealing means is provided to prevent the leakage of air around the edge of the casing 3.

In the use of the device as a pulsator for double chambered teat cups, the inner chambers of the teat cups (not shown) are connected to the pail so that the vacuum in the pail continuously tends to draw the milk from the teats into the pail. The outer chambers of the teat cups are connected by tubes (not shown) to the nipples 9 of the pulsator which, by the mechanism to be described, causes alternate periods of vacuum and atmospheric pressure in the outer chambers of the teat cups, which causes the flexible cup linings to expand and contract to massage and relieve the teats in a well understood manner.

The pulsator proper comprises a pulsator casing 10 preferably integral with the check valve casing 3 and open at both ends. The nipples 9 communicate with the casing 10 at 11 and a passage 12 connects the pulsator casing with the check valve casing 3 and the source of vacuum.

The lower end of the casing 10 is closed by a screw threaded cup 13 which is hollow on the inside to provide a chamber 14, the purpose of which will be described later. Between the inner end of the cup 13 and the shoulder 15 of the casing 10, a pliable diaphragm 16, which may be of leather, rubber or some suitable fabric, is inserted and firmly clamped at its edges. The center of the diaphragm carries the valve mechanism which in the specific form illustrated comprises a lower disc 16ª with a tubular stem 17 which projects upward through a hole in the diaphragm, and an upper disc 18 provided with a tubular portion 19, which slips over the stem 17 to permit the disc 18 to engage the upper surface of the diaphragm. The two discs 16ª and 18 are held upon either side of the diaphragm by the valve adjusting screw 20 which screws into the upper end of tubular stem 17 and compresses the spring 21 between the head 20ª of the screw and the top of tube 19 to press the discs firmly against the opposite sides of the diaphragm.

The lower end of the stem 17 is perforated to provide a port 22 into the chamber 14. This port is partially closed by the end of the screw 20 which, in cooperation with the seat 23, acts as a valve to control the passage of air to and from the chamber 14.

The air in passing to and from the chamber 14 goes through the holes 24 in the walls of stem 17 and the annular groove 25 and holes 26 in the outer tube 19 into the interior of the pulsator casing 10 which is divided by the diaphragm 16 and the valve seat 31 into the chamber 14 previously described, the vacuum chamber 28 into which opens the passage 12 and the pulsation chamber 27 into which opens the port 33ª to the atmosphere, the nipples 9 to the teat cups and the holes 26 of the tube 19. The tube 19 carries the valves 29 and 30 which are preferably made in the form of integral flanges and constitute the valve elements to control the admission of the vacuum and atmospheric pressure to the pulsation chamber 27. The valve seat, for cooperating with the valve 29, is the inwardly extending flange 31, preferably integral with the casing 10. The valve seat 32, for cooperating with the valve 30, is a part of the cap 33 which is screwed into the upper end of the casing 10. The seat 32 surrounds the atmospheric port 33ª in the cap. A screen or filter 34 for preventing the entrance of dirt or the like into the pulsator when the valve 30 is opened is provided in the cap 33.

In the operation of the device, starting from the position illustrated in Fig. 2, it will be seen that the suction which continuously exists in chamber 28 is communicated past the open valve 29 to the pulsation chamber 27 to the nipples 9 and thence to the outer chambers of the teat cups, to expand or draw out the walls of the cups. At the same time the suction temporarily existing in the chamber 27 draws the air from the chamber 14 through hole 22 into tubular stem 17, and out through holes 24 and 26 into the chamber 27, thence out through the port 12 and the suction nozzle 4. The rate at which the air is exhausted from the chamber 14 may be controlled by varying the distance between the end of the valve screw 20 and the seat 23. After a predetermined time, depending upon the adjustment of the valve screw 20, the air in chamber 14 is evacuated to such an extent that the atmospheric pressure acting upon the valve 30 forces the diaphram to flex, open valve 30 and close valve 29 as shown in Fig. 3. It is to be noted here that the quick seating of valve 29 is insured by the rush of air at atmospheric pressure through the port 33ª into the chamber 27 which due to the vacuum in chamber 28 instantly carries the valve 29 to its seat. The quick seating of the valves is facilitated by making the lift of the valves very small, which may be done while still obtaining sufficient portage, owing to the large circumference of the valves. In a pulsator such as illustrated a valve lift of one sixty-fourth of an inch ordinarily will be sufficient. In the drawings the movement of the valve parts and diaphragm is shown on a somewhat exaggerated scale for clearness of illustration. The closing of valve 29 cuts off the vacuum from the chamber 27 and at the same time permits the air entering through the port 33ª to flow through the nipples 9 to the outer chambers of the teat cups, where the atmospheric pressure in the outer chambers and the vacuum in the inner chambers causes the cup linings to collapse and compress the teats. At the same time the incoming air flows through the holes 26 and 24 into the stem 17 and through the port 22 into the chamber 14. After an interval of time, depending upon the adjustment of the valve screw 20, the pressure in the chamber 14 again builds up towards atmospheric and the difference in pressure due to the vacuum in chamber 28 causes the diaphragm to lift again to the first position. This cycle is regularly repeated, the frequency of the reversals being controlled by the adjustment of valve screw 20.

When the parts are in the position shown in Fig. 3 the movement of the diaphragm is opposed by the valve 29 which is held to its seat by the difference in pressure due to the atmospheric pressure in chamber 27 and the suction in chamber 28. The parts will be held in this position until the pressure in chamber 14 has built up sufficiently to lift the valve 29 against the atmospheric pressure, whereupon the seal between the valve and its seat will be broken and the resistance to further movement of the parts will be immediately decreased so that due to the pressure in the chamber 14 and the elasticity of the air which has accumulated in the chamber the valves will be quickly carried to the limit of their upward movement, thus producing a complete and rapid reversal of the air flow.

By properly proportioning the parts, particularly the relative diameters of the valve 29 and diaphragm, the periods during which the diaphragm and valves occupy one or the other of the illustrated positions may be varied so as to provide for a longer or shorter application of atmospheric pressure or vacuum to the outer chambers of the teat cups. I prefer to make these periods substantially equal and this is accomplished with proportions substantially as illustrated.

In the embodiment illustrated in Figs. 5 to 7, the check or reducing valve 55 is shaped with a skirt portion 55ª which fits down over the nipple 2 of the milk pail lid 1, and with a conical projection 55ᵇ which fits into the opening of nipple 2 to form a seal for the vacuum in the pail. The pulsator casing 56 is open at both ends as in Figs. 1 to 3, and is adapted to be closed at its lower end by the screw threaded cup 57, which is hollowed out to form the chamber 58, and to be closed at its upper end by the screw cap 59. A pliable diaphragm 60 is held at its edges between the cup 57 and the shoulder 61 of the pulsator and carries at its center a tubular stem 62 which is firmly held on the diaphragm by the nut 63 and shoulder 65 between which the washers 64 are pressed against each side of the diaphragm.

Near its lower end the bore of the valve stem 62 is reduced at 66 to provide a valve seat which cooperates with the lower end of screw 67 to regulate the flow of air to and from the chamber 58.

The stem 62 is also provided upon the outside with a shoulder 68 upon which the valve 69 is supported. The valve 69 comprises a supporting disc 70, a gasket 71 which may be leather, rubber or the like, and a backing plate 72. The surface of the plate 72 is provided with beads or elevations 73 which serve to space the valve 74 from the valve 69.

The valve 74 consists of a supporting or backing plate 75 and a suitable gasket 76. Both the valves 69 and 74 are held upon the stem 62 by the collar 77 which is pushed downward upon the stem by the valve screw 67, screwed into the upper end of the stem 62 and by the spring 78 between the head of the screw and the top of the collar 77.

Screens 79 and 80 are provided in the top of plug 59 to keep the dust and dirt out of the pulsator.

In the operation of this embodiment, which is similar to that of the embodiment shown in Figs. 1 to 3, starting from the position of Fig. 6, the air is drawn through the nipples 9, chambers 27 and 28, and passage 12 to the suction nozzle 4, to exhaust the outer chamber of the teat cups and expand the cup linings. At the same time the air is also drawn from the chamber 58 through stem 62 and holes 81 into chamber 27, to evacuate the chamber 58. When the air pressure in the chamber 58 is reduced to a certain value, the atmospheric pressure on valve 74 will force the diaphragm down to the position of Fig. 7 to close the valve 69 and cut off the vacuum from chamber 27 and to open the valve 74 to admit the air at atmospheric pressure to the chamber 27 and nipples 9 to contract or collapse the walls of the teat cup linings. The air coming into the chamber 27 also flows through the holes 81 and stem 62 into the evacuated chamber 58 to build up the pressure in the chamber. When the pressure in the chamber 58 has risen to a certain degree, the difference between the pressure upon the lower side and the suction in chamber 28 on the upper side of the diaphragm is sufficient to overcome the atmospheric pressure on the valve 69 and return the parts of the pulsator to the position of Fig. 6, from which position the pulsating cycle is again repeated. As the changes in the position of the diaphragm and other parts of the pulsator depend upon the reduction or building up of the pressure in chamber 58, it is obvious that the rate of pulsations can be controlled by controlling the passage of air to and from the chamber 58 by means of the valve screw 67 and the valve seat 66.

It will be seen that, by the invention herein described, I have provided a pulsator in which a pliable diaphragm is actuated solely by differences in the fluid pressure upon opposite sides of the diaphragm to cause regular and uniform pulsations. While, as stated, the invention is especially useful as a pulsator for milking machines, it may be employed also for other purposes to which a pulsator of this character is applicable.

Various modifications can be made in the embodiment shown, and certain features of the device may be used without others without departing from the spirit of the invention or the scope of the following claims which are intended to claim the invention as broadly as the state of the prior art will permit.

What I claim is:

1. In a fluid operated pulsator, valve means, a motor element, means to vary the pressure at each side thereof to actuate the motor element and move the valve means, and means utilizing fluid pressure to prevent actuation of the valve means in either direction until the pressure difference upon opposite sides of the motor element exceeds a predetermined minimum, so as to insure complete and rapid reversals of the pulsating fluid, controlled by the valve means.

2. In a fluid operated pulsator for milking machines or the like, valve means, a pliable diaphragm for operating the valve means, means to vary the pressure opposite the diaphragm to cause flexing thereof, and means utilizing fluid pressure to prevent the flexing until the pressure difference upon opposite sides of the diaphragm is sufficient to cause complete flexing to carry the valve means to the limit of its movement in either direction.

3. In a vacuum operated pulsator mechanism, the combination of a valve for controlling the action of the vacuum, said valve when closed being subjected to the vacuum on one side and to a greater pressure on the other side, and means operated by an unbalanced pressure condition produced by the vacuum and atmosphere for actuating said valve, the movement of said means being opposed by the pressure on said valve greater than the vacuum so as to insure complete opening of the valve when such pressure has been overcome and the movement of the valve is started.

4. In a fluid operated pulsator for milking machines and the like, the combination of a casing having therein a vacuum chamber, a pulsation chamber and an air reservoir, a pliable diaphragm forming a wall between said vacuum chamber and said air reservoir, a puppet valve operatively connected with said diaphragm and adapted to open and close communication between said pulsation and vacuum chambers, and means providing an air leak between said pulsation chamber and said air reservoir.

5. In a fluid operated pulsator for milking machines and the like, a vacuum chamber and a pulsation chamber, a valve seat between said chambers, a lift valve adapted to close on said seat in the direction of the vacuum chamber, and a motor element connected to said valve and adapted to be operated by variations in the pressure acting thereon, movement of said motor element when said valve is closed being opposed by atmospheric pressure on the outside of said valve until the pressure difference for actuating the motor element has become sufficiently great to move the valve against such atmospheric pressure, the initial movement of the valve from its seat serving to admit air to the vacuum chamber and thereby to cause a complete throw of the motor element and valve as soon as the seal between the valve and its seat is broken.

6. In a pulsator for milking machines and the like, a pulsating diaphragm, a vacuum chamber on one side thereof, and an air reservoir upon the other side, and automatic means actuated solely by the diaphragm for varying the pressure in the reservoir to cause pulsations of the diaphragm.

7. In a pulsator for milking machines and the like, a pliable diaphragm, a valve carried thereby, a vacuum chamber upon one side of the diaphragm and an air reservoir upon the other side, means to subject the reservoir to atmospheric pressure to cause upward pulsations in the diaphragm and means to subject the reservoir to a vacuum to cause downward pulsations, said downward pulsations being produced partially by the atmospheric pressure upon the valve carried by the diaphragm.

8. In a pulsator for milking machines and the like, a pliable diaphragm, a valve carried thereby, a vacuum chamber upon one side of the diaphragm and an air reservoir upon the other side, means to subject the reservoir to atmospheric pressure to cause upward pulsations in the diaphragm, and means to subject the reservoir to a vacuum to cause downward pulsations, an opening through which the controlling fluid flows to and from the reservoir to cause the pulsations, and means to control the size of the opening to vary the rate of flow to and from the reservoir and thereby control the rate of pulsations.

9. In a fluid operated pulsator for milking machines and the like, a casing having a chamber therein alternately subjected to vacuum and atmospheric pressure, said chamber having two ports opening thereinto and two valves therein arranged to close their respective ports alternately, and a motor element connected to said valves and actuated by differences of pressure to which it is subjected, the atmospheric pressure in said chamber when said chamber is subjected to atmospheric pressure, acting upon one of said valves to oppose movement of said valves, and motor element and the atmospheric pressure outside of said chamber acting upon the other of said valves when said chamber is subjected to a vacuum, to induce movement of said valves and motor element.

10. In a fluid operated pulsator for milking machines and the like, a pliable diaphragm, a vacuum chamber upon one side thereof and fluid reservoir upon the other, and a double valve connected to the diaphragm and controlled by the pulsations thereof to control the flow of the operating fluid to and from the teat cups of the milking machine and to and from the fluid reservoir.

11. In a fluid operated pulsator for milking machines, and the like, a pliable diaphragm, a vacuum chamber upon one side thereof and fluid reservoir upon the other, and a double valve connected to the pulsator and movable therewith to control the operating fluid, and a hollow stem in the valve through which the fluid flows to and from the fluid reservoir.

12. In a fluid operated pulsator for milking machines, and the like, a pliable diaphragm, a vacuum chamber upon one side thereof and a fluid reservoir upon the other, a double valve connected to the pulsator and movable therewith to control the operating fluid, a hollow stem in the valve through which the fluid flows to and from the fluid reservoir, and means to control the rate of flow through the stem.

13. In a pulsator, the combination of a pliable diaphragm, means causing a continuous vacuum to act upon one side thereof and means for causing variations in the pressure upon the other side to move the diaphragm, a valve actuated by said diaphragm, and means to resist movement of the diaphragm until the difference in pressure upon the opposite sides thereof is sufficient to carry the valve through a complete movement.

14. In a pulsator, the combination of a casing having a chamber in the lower part thereof, and a tubular bore, a diaphragm mounted transversely of said chamber, a valve stem extending upwardly through said bore, the lower end of said valve stem engaging said diaphragm, said bore having a pair of valve seats therein dividing the same into a suction chamber, and a pulsator chamber, a poppet valve fixedly mounted on said valve stem and adapted to seat upwardly against the upper of said valve seats, a second puppet valve fixedly mounted on said valve stem and adapted to seat downwardly on the lower of said valve seats, and a fluid connection between said pulsation chamber and said diaphragm chamber.

15. In a fluid operated pulsator for milking machines, and the like, a diaphragm, a suction chamber on one side and a fluid reservoir upon the other side of the diaphragm, means to cause variations in the fluid pressure in the reservoir to cause pulsations in the diaphragm and a hole through the diaphragm through which the pressure fluid flows to and from the reservoir.

16. In a fluid operated pulsator for milking machines, and the like, a diaphragm, a suction chamber on one side and a fluid reservoir upon the other side of the diaphragm, means to cause variations in the fluid pressure in the reservoir to cause pulsations in the diaphragm and a valve controlled port through the diaphragm through which the pressure fluid flows to and from the reservoir.

17. In a fluid operated pulsator for milking machines and the like, a controlling mechanism comprising the combination of the diaphragm having a hole therein, chambers at opposite sides of the diaphragm, a tubular stem fixed to the diaphragm and extending through said hole, a valve fixed on said tubular stem and adjusting means for regulating the leakage of air through said tubular stem from one side of the diaphragm to the other.

18. In a fluid operated pulsator for milking machines and the like, the combination of a casing having a chamber therein, a controlling mechanism comprising a flexible diaphragm forming one wall of said chamber, a hollow stem carried by said diaphragm having an adjustable leak therein communicating with said chamber and valve means actuated by said stem.

19. In a pulsator for milking machines and the like, the combination of a diaphragm carrying a tubular stem which projects through a hole in the diaphragm, a disc on the other side of the diaphragm provided with a tubular element which fits over the stem and means for holding the discs against the diaphragm comprising a screw threaded into the stem and a spring between the head of the screw and the end of the tubular element, the tubular element carrying a pair of valves and communication between the valves to the interior of the first tubular element.

20. In a fluid operated pulsator for milking machines and the like, a casing having a pulsation chamber, a vacuum chamber and an air reservoir therein, a movable motor element dividing said vacuum chamber from said air reservoir, means for admitting air to said air reservoir to cause movement of the motor element in one direction, and a valve operatively connected with said motor element and arranged to open and close communication between said pulsation chamber and the atmosphere, the atmospheric pressure on said valve when closed acting to induce movement of said valve and the motor element when pressures on opposite sides of said motor element are substantially equalized.

In testimony whereof I have affixed my signature to this specification.

HERBERT McCORNACK.